United States Patent [19]

Adair

[11] 4,085,185

[45] Apr. 18, 1978

[54] METHOD OF SEALING CONCENTRIC TUBE ENDS TO MAKE SEALED DUAL-WALL TUBE

[76] Inventor: Edwin L. Adair, 5985 S. Crocker St., Littleton, Colo. 80120

[21] Appl. No.: 708,064

[22] Filed: Jul. 23, 1976

Related U.S. Application Data

[62] Division of Ser. No. 564,775, Apr. 3, 1975, abandoned.

[51] Int. Cl.² ............... B29C 11/00; B29C 27/00; B29F 1/00
[52] U.S. Cl. ................................ 264/248; 156/296; 156/306; 264/262; 264/263; 264/320; 264/331
[58] Field of Search ........ 264/248, 266, 267, 294–296, 264/320, 322, 299, 259, 261–263, 25; 156/306, 308, 303.1, 272, 273, 296; 425/517, 521

[56] References Cited

U.S. PATENT DOCUMENTS

| | | | |
|---|---|---|---|
| 2,285,980 | 6/1942 | Jeckel | 264/322 |
| 2,641,301 | 6/1953 | Gerber et al. | 156/306 |
| 3,103,170 | 9/1963 | Covington et al. | 264/320 |
| 3,120,570 | 2/1964 | Kennedy et al. | 264/263 |
| 3,438,824 | 4/1969 | Balamuth | 156/306 |
| 3,558,397 | 1/1971 | Clark | 156/306 |
| 3,725,522 | 4/1973 | Sheridan et al. | 264/296 |
| 3,749,621 | 7/1973 | Shoffner | 156/272 |
| 3,798,094 | 3/1974 | Costa | 156/272 |
| 3,843,300 | 10/1974 | McFarlane | 264/322 |
| 3,861,972 | 1/1975 | Glover et al. | 156/303.1 |
| 3,929,943 | 12/1975 | Klimaszewski | 264/25 |
| 3,959,429 | 5/1976 | Benning | 264/294 |

*Primary Examiner*—Willard E. Hoag
*Attorney, Agent, or Firm*—Sheridan, Ross, Fields & McIntosh

[57] ABSTRACT

A method for sealing together the ends of concentrically arranged tubes of plastic material to make a double-walled tube which comprises inserting the assembled ends into a mold means conforming substantially in size to the outer periphery of the finished tube and applying heat to seal the tube ends together. Preferably, the tubes during heating are arranged concentrically with the end of one tube extending beyond the end of the other tube and if the materials of the two tubes have different melting points, the tube having the lower melting point extends slightly beyond the other tube. Preferably, a rod of material having good heat conductivity and a melting point higher than that of the plastic tubes is positioned inside the inner tube with its end slightly below the sealing area. The tube edges can be sealed together leaving an opening in the finished end or the finished end sealed completely over. The tube edges can be sealed together around a removable metal element, such as a trochar with a sharp point which is used for inserting the finished product in a body drainage area followed by removal of the trochar after locking the double-walled tube in the drainage area. The heating is preferably performed by applying high frequency radiation to the mold in which the assembled ends to be sealed are inserted followed immediately after heating with coolant circulation through the mold to quickly cool the finished product.

15 Claims, 6 Drawing Figures

METHOD OF SEALING CONCENTRIC TUBE ENDS TO MAKE SEALED DUAL-WALL TUBE

This is a division of application Ser. No. 564,775 filed Apr. 3, 1975 now abandoned.

BACKGROUND OF THE INVENTION

The invention relates to the art of molding or sealing together the ends of plastic tubes using heat to provide a double-walled finished product which can be used in the manufacture of catheters or other devices for draining body cavities. High frequency induction heating is used to supply fast heat to the plastic tubes followed by rapid cooling of the tubes by circulating coolant through the mold in which the tubes are heated.

The invention is particularly useful for making double-walled tubes, such as, those disclosed in U.S. Pat. Nos. 3,108,595 and 3,241,554 to be used in body drainage devices, such as, catheters. In accordance with the disclosure of the first patent referred to, the tubes are made of rubber or nylon and may be fastened together by the interlocking method shown in FIG. 7. In this type of catheter, the tube ends must be fastened together so that the inner tube can be moved relative to the outer tube by pulling on it to expand flexible locking wings in the outer tube for locking the device in the body cavity during drainage. Processes for sealing the ends of concentric plastic tubes are disclosed in the second patent.

In sealing the ends of the concentric plastic tubes together, considerable difficulty has been experienced in the past due to the fact that it is difficult to mold the joint with sufficient plastic in the joint to provide the required strength to move the tubes relative to one another. This is particularly true when the materials of the tubes are of different plastics which have different melting points. It is very difficult to melt and incorporate enough plastic in the joint to make it sufficiently strong. To accomplish this it is necessary to heat the tube ends as rapidly as possible and to cool the melted plastic rapidly to attain sufficient plastic in the joint to make it strong. In medical applications wherein drainage tubes must be inserted in a chest cavity, for instance, it is necessary to have a sharp metal point associated with the drainage device to facilitate its insertion in the cavity. This requires a metal puncturing instrument in association with the drainage tube, and structure, such as a shoulder, must be provided inside the drainage tube against which the metal instrument or trochar seats for forcing the double-walled tube through the channel made by the trochar into the cavity to be drained.

Accordingly, it is an object of this invention to provide a method for sealing together the ends of two concentrically arranged plastic tubes to provide a strong joint.

It is another object to provide a method for making a combination double-walled drainage tube and metal trochar for use in drainage devices for draining body cavities.

SUMMARY OF THE INVENTION

A method for sealing the edges and/or ends of concentric plastic tubes which comprises inserting the assembled ends in a mold cavity, applying radio frequency induction heating to the mold to melt the tube ends and seal them together. In order to provide sufficient plastic to make a strong joint, it is preferable to let one tube end extend above the other. A further improvement directed to providing sufficient material in the joint is to perform the sealing while a metal rod is inserted inside the inner tube with its end slightly below the sealing area. This feature is particularly important when the tubes are made of plastics having different melting points. A further feature of the invention is sealing the edges of the two tubes with the end of a metal trochar protruding beyond the sealed ends of the tubes, and providing an internal shoulder in the finished tube end against which a shoulder on the trochar seats so that the trochar will force the drainage tube through the opening made by it in the body wall.

BRIEF DESCRIPTION OF THE DRAWINGS

The invention will now be described by reference to the accompanying drawing in which:

Referring to FIG. 1, the numeral 10 represents a mold made of conductive metal for radio frequency heating. The mold is provided with a mold cavity 12 in which the assembled ends of concentric plastic tubes are placed for sealing. The mold, which is shown in schematic, is adapted to be heated by radio frequency induction heating as disclosed in U.S. Pat. No. 2,831,953. It is provided with a cooling circuit shown schematically by the inlet and outlet tubes indicated at 14 through which a coolant such as water or other suitable liquid is circulated. By use of this arrangement, the tube ends can be rapidly heated and then cooled rapidly to provide the maximum amount of plastic in the finished sealing area.

An assembly of inner and outer concentric plastic tubes 16 and 18, respectively, is shown in the mold cavity arranged with the outer tube extending beyond the inner tube so that the two tube ends are axially spaced apart. If the tubes are made of plastic having different melting points, the extending tube is always the one made of the lower melting point plastic. This arrangement of tubes with one end extending beyond the other end is shown in all figures and its description will not be repeated.

The arrangement of the tubes with one end extending beyond the other end has been found to greatly facilitate sealing the tube ends with only the edges sealed, or completely sealing the tube ends over to provide a finished product having a sealed end with the inner and outer tubes sealed together.

The sealing method is performed on tubes made of plastic materials having the same or different melting points. This includes tubes made of polymers of the same compound having different melting points or of different polymers having different melting points.

Tubes of polyethylene, Teflon ®, polypropylene, polyurethane, and ethylene vinyl acetate have been adequately sealed. The protruding end should extend about a tube diameter beyond the other end.

Figure 1:
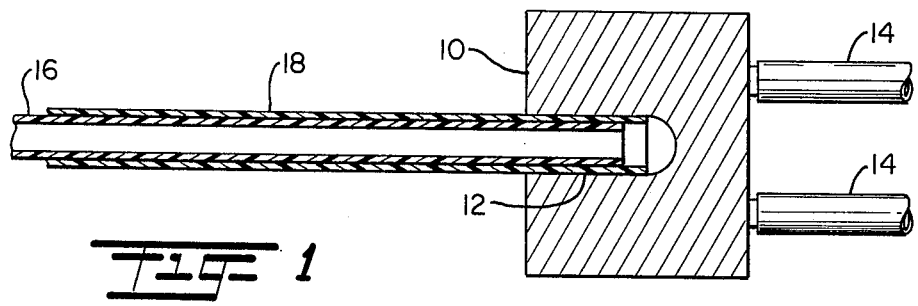
FIG. 1 is a schematic showing of a cross-section of a mold showing two concentric tubes in cross-section assembled in the mold cavity for sealing the ends.
Figure 2:
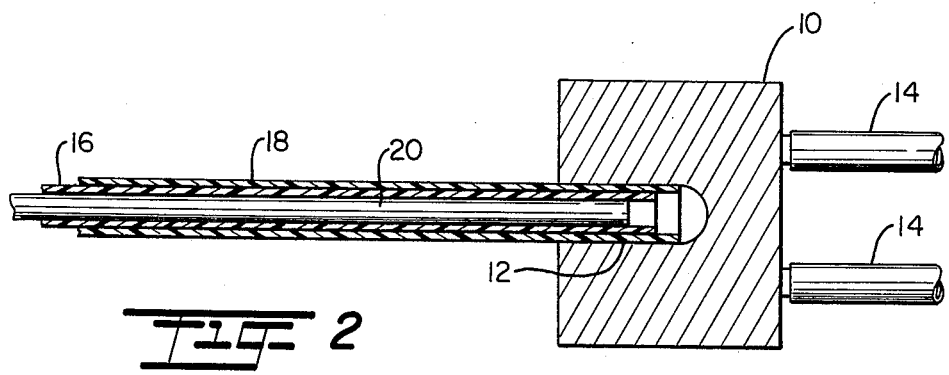
FIG. 2 is a showing of an assembly similar to FIG. 1 in which a metal rod is included in the tube assembly.

An additional feature of the invention is shown in FIG. 2 in which a rod 20 is inserted inside the inner tube to facilitate making a strong joint. The central rod is preferably made of aluminum or copper or some other metal having high heat conductivity and a melting point above that of the plastics. The purpose of the metal rod is to facilitate conduction of heat through the sealing area and to form a dam to hold the maximum amount of melted plastic in the sealing area to make a strong joint. The plastic, of course, does not seal to the metal rod so that the latter can be readily removed from the sealing area. This feature plus the feature of extending one tube end axially beyond the other greatly facilitates the manufacture of a strong joint containing the maximum amount of plastic material. By use of this feature, either the edges of the tubes can be sealed leaving an end opening in the finished product or the entire tube ends can be sealed over.

Figure 3:
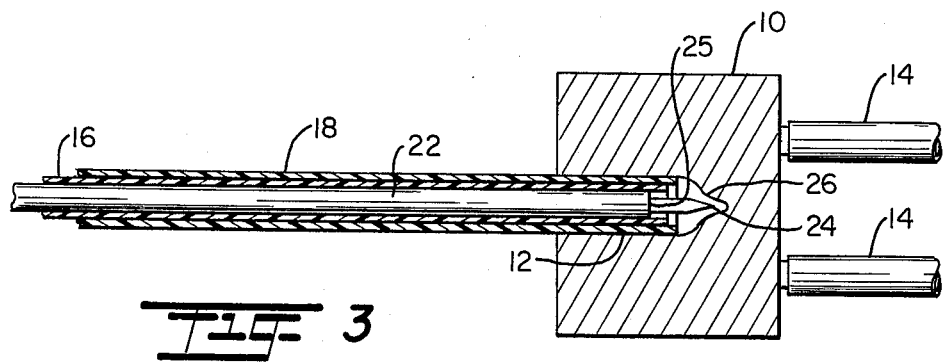
FIG. 3 is a showing of an assembly similar to FIG. 2 in which a metal trochar or other metal element is assembled inside the tube ends as they are sealed with part of the element protruding through the front of the finished tube.

Referring to FIG. 3, the concentric tubes are shown arranged with one tube end protruding beyond the other and with a metal trochar 22 assembled inside the tubes. As in all the different applications, different mold cavity conformations must be used to conform with the desired finished product. In this instance, the trochar 22 is provided with a sharp point 24 and the mold cavity 26 is conformed accordingly. The trochar 22 is provided with shoulders 25 and the plastic of the tube ends is molded to provide a mating shoulder corresponding to the shoulder 25 on the trochar. After the assembly has been sealed or molded and withdrawn from the mold, the finished product is a combination double-walled tube and trochar. It can be used as part of a drainage device which can be inserted into a body cavity, such as, the chest cavity by use of the pointed end 24 and the trochar removed from the assembly to leave a drainage channel for the internal cavity. The mating shoulders on the trochar and internally of the double-walled tube permit the tube to be pushed through the channel made by the pointed end 24 of the trochar to provide a drainage channel out of the body cavity. For locking the drainage device in place the outer tube of the double-walled tube in the drainage tube application may be provided with circumferentially-spaced collapsible wings made by cutting slits in the tube which can be expanded to hold the drainage tube in the body cavity by pulling back on the inner tube. The collapsible wing structure in the outer tube is similar to that disclosed in my U.S. Patents 3,692,029 and 3,713,447. Various other combinations of double-walled tube and inner element for various uses can be made in accordance with this feature of the process.

Figure 4:
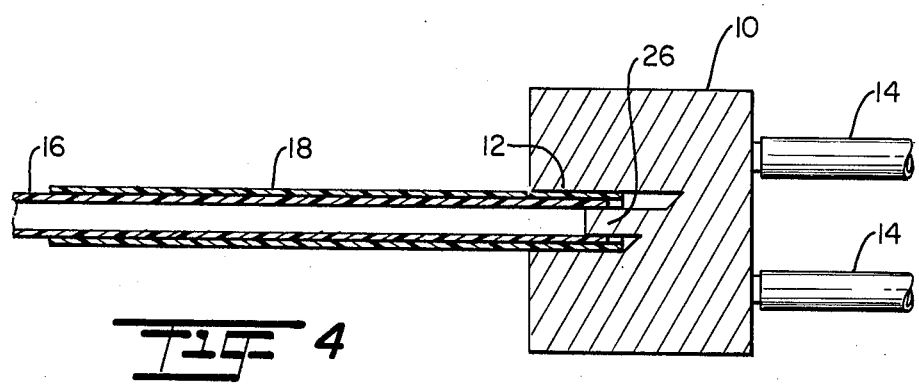
FIG. 4 is a showing of an assembly for sealing the tube edges in which the concentric tubes are assembled with their ends over a mold core extending from the bottom of the mold cavity.

FIG. 4 illustrates a method for making "open end" fused tubes by modifying the mold to provide a central metal core 26. In this application the concentric tube ends are assembled over the mold core with the end of one tube extending beyond axially the end of the other tube and the sealing of the tube edges accomplished.

Figure 5:
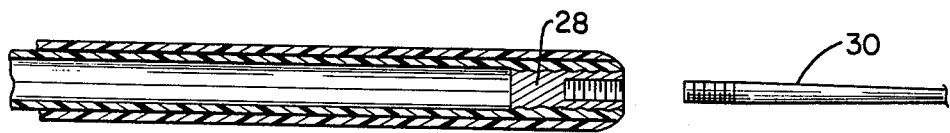
FIG. 5 is a cross-section of another modification of the invention.

Reference is made to FIG. 5 for another modification of the invention in which a holding stud 28 of hard material such as metal is molded inside the inner tube of double or single walled tubes. The insert is provided with male or female threads for attachment of a threaded filiform element 30, for example, by threadably attaching the two parts together. There are a number of medical applications where such a tube with a threaded stud attached would be useful. The metal stud may be provided with an indentation, threads or other irregularity around which the plastic seals to hold it in place. If a double-walled tube is used, the channel between the two walls may with suitable modification be used as a drainage channel.

The stud device 28 may be made of specific metals having properties for this application, such as, copper which has medical application in the manufacture of intrauterine devices. It may also take the form of a magnet. Magnetic inserts in the tip of a catheter have applications both as holding devices to maintain a catheter in fixed position, or as a guidance element through which the position of the catheter inside the body could be changed by use of an external magnetic source. The magnetic device can be made of any desired shape or configuration and can preferably be semarium-cobalt extremely strong magnets now on the market.

Figure 6:
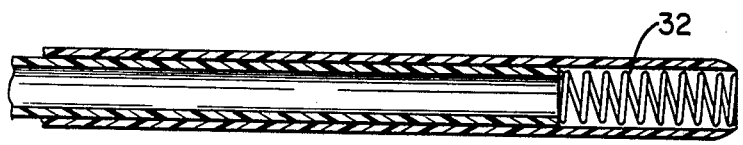
FIG. 6 is a cross-section of a further modification of the invention.

A further modification is shown in FIG. 6 in which the insert is a spring 32 which has application in stiffening or adding flexibility to the tips of elements of softer plastic materials.

Each of the above type of inserts as well as being molded in place can be held in place by attachment to the end of the metal rod 20 in the modification of FIG. 2.

Tubes have been made by the above-described process in which the joint between the tubes has not broken in usages of the finished double-walled tube in body drainage devices. Successful joints have been made both without and with the use of a metal rod made of aluminum in accordance with the modification of FIG. 2. Highly useful and successful combination double-walled drainage tubes and penetration trochars have been made for the drainage of chest cavities in accordance with the modification illustrated in FIG. 3. The trochar may be made of any suitable metal which has sufficient strength for penetration where needed. Obviously, the metal must have a melting point higher than that of the plastics. It will be seen that the shoulder 25 (FIG. 3) of the trochar performs the additional function during sealing of damming melted plastic to form the mating shoulder in the inner tube.

I claim:

1. A method for sealing together the ends of at least two different diameter tubes made of thermoplastic materials heat-sealable together to form a multiple-walled tube which comprises:
   (a) arranging the tubes concentrically with the ends to be sealed near each other, the end of one tube being positioned to extend beyond the end of the other tube;
   (b) positioning a rod having good heat conductivity and a higher melting point than the plastic of the tubes inside the inner tube with its one end spaced slightly axially inwardly of the end of said other tube to form an assembly of ends of said inner and outer tubes and rod;
   (c) placing said ends in a mold cavity having a surface conforming substantially to a desired outer surface of the sealed tube ends; and
   (d) heating said tube ends to a temperature sufficient to at least soften the plastic of the extended tube and seal the tube ends together, and shaping said plastic against the heat-conducting metal rod which facilitates conduction of heat through the sealing area and forms a dam to hold the maximum amount of melted plastic in the sealing area to make a strong joint and a multiple-walled tube is formed in which the ends of the tubes are sealed together.

2. The method of claim 1 in which the sealing is conducted to form a tube having a completely closed end.

3. The method of claim 1 in which the tube ends are sealed by electrical high frequency heating said mold.

4. The method of claim 1 in which the rod is metal.

5. The method of claim 1 in which the tubes are made of thermoplastic materials having different melting points and the end of the tube made of the lower melting point plastic material extends slightly beyond the end of the other tube during the sealing of the tube ends.

6. The method of claim 5 in which the sealing is conducted to form a (double-walled) tube having a completely closed end.

7. The method of claim 1 in which the ends of the tubes are axially spaced apart during sealing.

8. The method of claim 7 in which the tubes are made of different melting point plastics and the end of the tube made of the lower melting point plastic extends beyond the end of the other tube.

9. The method as described in claim 1 for sealing together the ends of different diameter tubes to make a combination multiple-walled tube, the rod concentrically-positioned within said tubes having a circumferential shoulder near its end, the method further including the steps of:

arranging the tubes and rod concentrically with the rod inside the inner tube and its shoulder near the sealing end area of the tube ends; and heating the assembly in the area of the tube ends to seal their edges together and form an internal shoulder in the sealing area corresponding to the shoulder of the rod.

10. The method of claim 9 in which the end of the rod adjacent its shoulder protrudes beyond the ends of the tubes during sealing.

11. A method for completely sealing together the edges of at least two different diameter tubes made of thermoplastic material heat-sealable together to form a multiple-walled tube with a completely closed end which comprises:

(a) arranging the tubes concentrically with the ends to be sealed near each other, one of said tubes being positioned to extend beyond the other;

(b) placing the ends to be sealed in a mold cavity having a surface conforming substantially to the desired outer surface of the sealed tube ends; and (c) heating the ends of the assembled tubes and at least said extending tube end being heated sufficiently to seal the tube ends together to form a completely closed end and form a multiple-walled tube.

12. The method of claim 11 in which the tubes are sealed by electrical high frequency heating and rapidly cooled after heating of the mold.

13. The method of claim 11 in which the tubes are arranged during sealing with the ends of the tubes axially spaced apart.

14. The method of claim 13 in which the tubes are made of plastics having different melting points, the tube of lower melting point plastic extends beyond the end of the other tube a distance of about its external diameter during heating, and the tube ends are sealed to form a completely sealed end.

15. The method of claim 13 in which the tube ends are completely sealed off.

* * * * *